(12) United States Patent
Benson

(10) Patent No.: US 10,330,227 B2
(45) Date of Patent: Jun. 25, 2019

(54) PIPE COUPLING

(75) Inventor: Andrew James Benson, Harpenden (GB)

(73) Assignee: CRANE LTD, Hitchin, Herts (GB)

( * ) Notice: Subject to any disclaimer, the term of this patent is extended or adjusted under 35 U.S.C. 154(b) by 1682 days.

(21) Appl. No.: 13/505,090

(22) PCT Filed: Nov. 1, 2010

(86) PCT No.: PCT/GB2010/002017
§ 371 (c)(1),
(2), (4) Date: Dec. 14, 2012

(87) PCT Pub. No.: WO2011/051688
PCT Pub. Date: May 5, 2011

(65) Prior Publication Data
US 2013/0082463 A1 Apr. 4, 2013

(30) Foreign Application Priority Data

Oct. 30, 2009 (GB) .................................. 0919096.8

(51) Int. Cl.
*F16L 21/04* (2006.01)
*F16L 21/08* (2006.01)

(52) U.S. Cl.
CPC ............... *F16L 21/04* (2013.01); *F16L 21/08* (2013.01)

(58) Field of Classification Search
CPC .................................. F16L 21/08; F16L 21/04
USPC ................. 285/337, 421, 21.1; 403/368–371
See application file for complete search history.

(56) References Cited

U.S. PATENT DOCUMENTS

| 2,563,851 | A | * | 8/1951 | Lundeen | E21B 19/07 175/423 |
| 2,900,685 | A | * | 8/1959 | Marburg | B22D 7/10 249/198 |
| 3,469,850 | A | | 9/1969 | Smith | |
| 5,188,401 | A | * | 2/1993 | Staniforth | F16L 19/083 285/249 |

(Continued)

FOREIGN PATENT DOCUMENTS

EP 1292792 12/2001
EP 1 906 073 4/2008
(Continued)

OTHER PUBLICATIONS

International Search Report for corresponding patent application No. PCT/GB2010/002017 dated Mar. 25, 2011.

*Primary Examiner* — James M Hewitt, II
(74) *Attorney, Agent, or Firm* — Renner, Otto, Boisselle & Sklar, LLP

(57) ABSTRACT

The invention provides a pipe coupling configured for coupling pipes over a range of diameters including a gripping and sealing assembly comprising a ring of circumferentially linked carrier members (1) the circumferentially discontinuous members are interlinked by means of a tongue and groove connection between a groove (2) on a first member and a tongue (3) on an adjacent member, the opening of the groove which receives the tongue facing in a plane not in alignment with a tangent of the circumferential plane of the carrier and each tongue is attached to its member by a resiliency deformable arm whereby to provide stability of the circumferential links in the absence of any additional support.

18 Claims, 12 Drawing Sheets

(56) References Cited

U.S. PATENT DOCUMENTS

| | | | | |
|---|---|---|---|---|
| 5,333,916 | A | * | 8/1994 | Burkit ............... F16L 17/10 |
| | | | | 138/99 |
| 6,257,628 | B1 | * | 7/2001 | Nijsen ............... F16L 21/04 |
| | | | | 285/322 |
| 8,505,985 | B2 | * | 8/2013 | Nijsen ............... F16L 21/08 |
| | | | | 285/323 |
| 2003/0085566 | A1 | * | 5/2003 | Rex .................. F16L 21/04 |
| | | | | 285/104 |
| 2008/0281166 | A1 | | 11/2008 | Darce |

FOREIGN PATENT DOCUMENTS

| | | |
|---|---|---|
| EP | 2 090 815 | 8/2009 |
| GB | 1343602 | 11/1970 |
| GB | 2227067 | 7/1990 |
| WO | 2001/96774 | 12/2001 |
| WO | 2008/143743 | 4/2008 |

\* cited by examiner

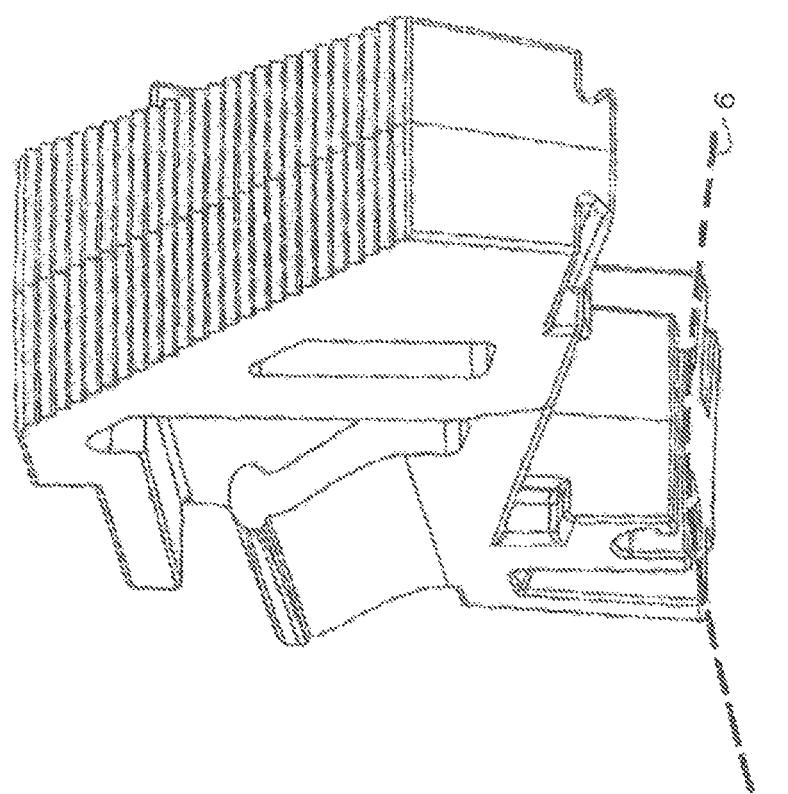

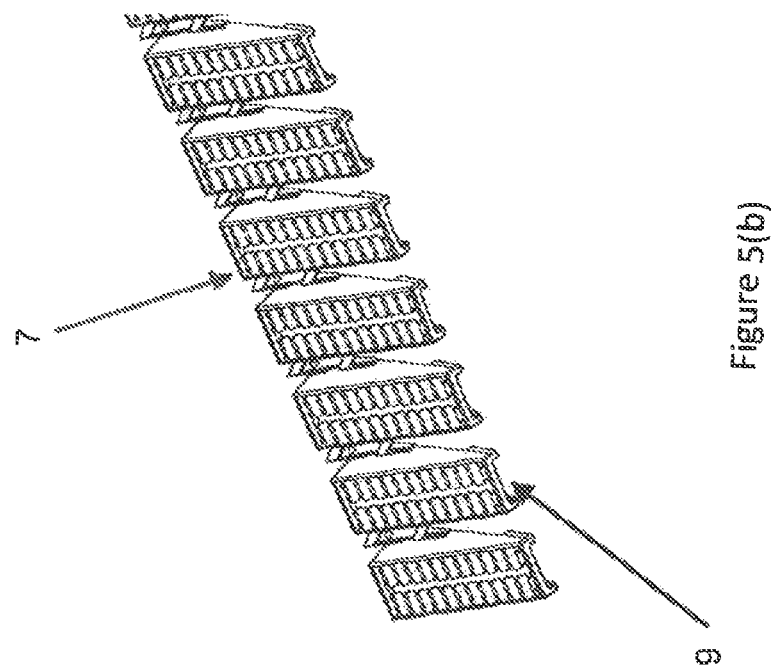
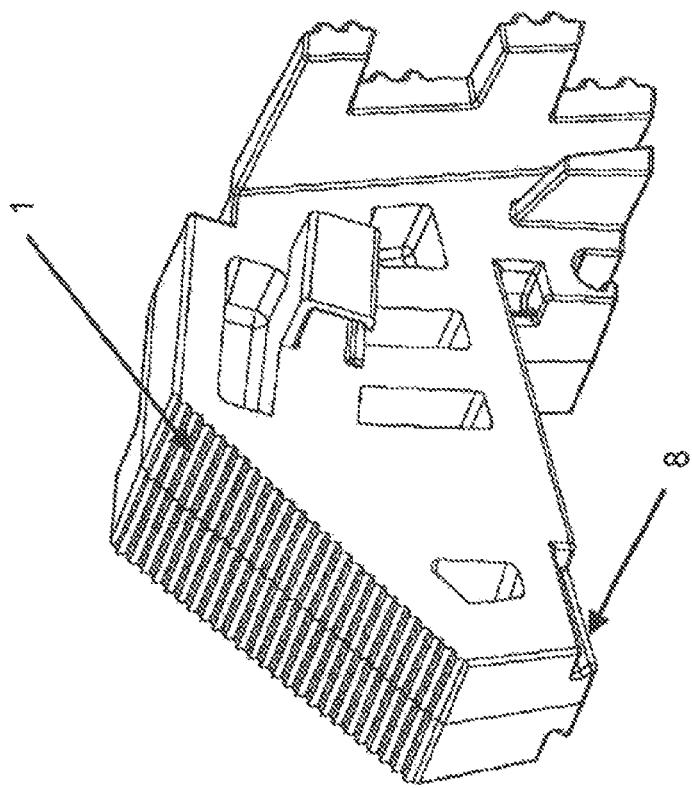
Figure 5(b)
Figure 5(a)

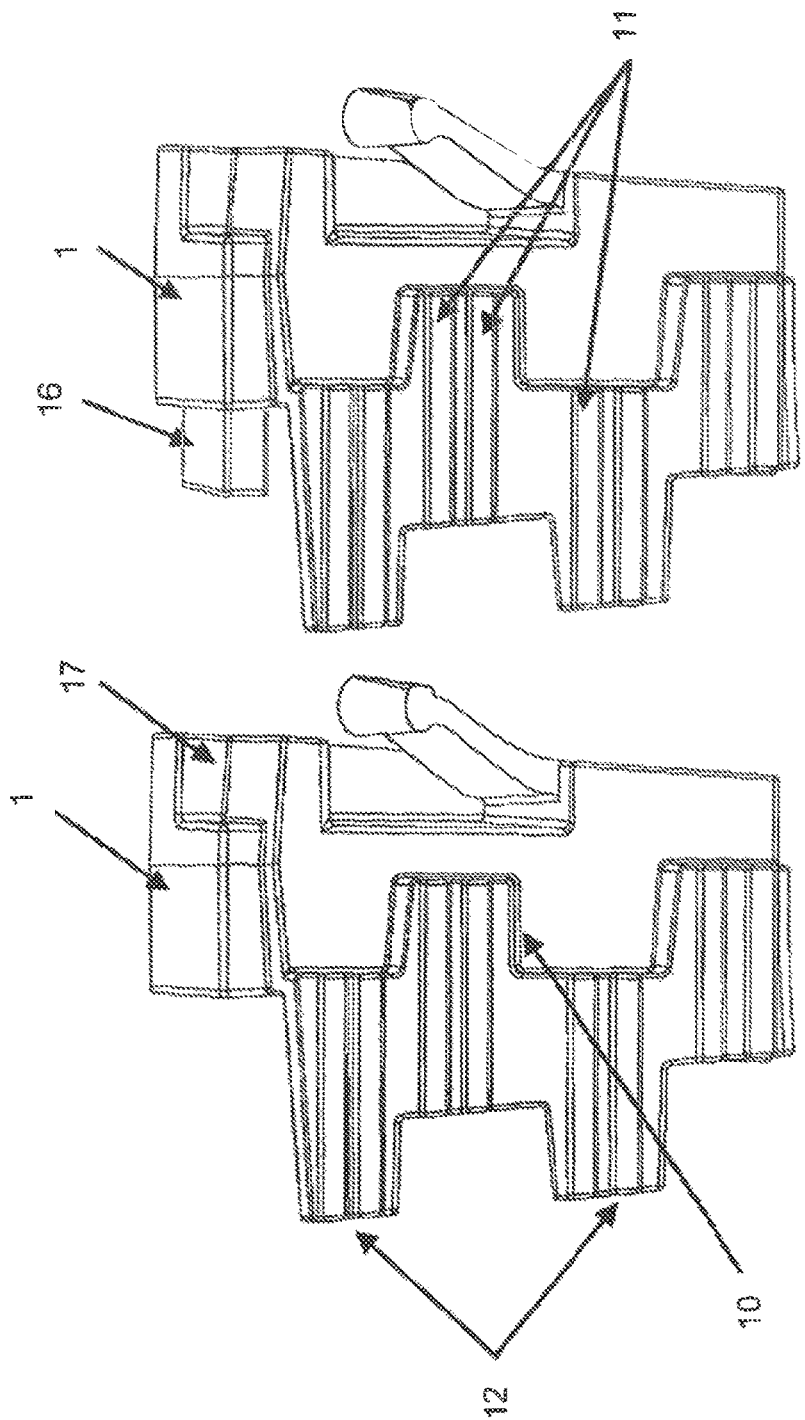

PIPE COUPLING

This application is a national phase of International Application No. PCT/GB2010/002017 filed Nov. 1, 2010 and published in the English language.

The present invention relates to a device for coupling to a pipe. In particular, the invention relates to a pipe coupling device which grips and seals pipes with a range of outer diameters.

Pipe couplings adapted for gripping and sealing pipes in a range of diameters are known. One example of such a coupling is described in the Applicants European Patent EP1292792B1.

Couplings of the structure broadly as described in EP1292792B1 have been in commercial use for several years and have provided users substantial benefits over the previous products. However, with the benefit of experience, the Applicant has identified features of their earlier product design which can be improved upon to provide an even more effective product.

It has been found that the performance of the prior art pipe couplings could be improved for use by inexperienced or unskilled operators in regard to; the quality of sealing on poor pipe surfaces, easier installation, retention of gripper elements in carriers during mounting of the coupling on a pipe, retention of grit during transit and assembly to a pipe; collapsing of carriers under the weight of couplings during transit impacting on assembly of the coupling to pipes nearing top tolerance; dragging of gaskets from carriers during assembly to bottom tolerance pipes; pressure safety factors on test pressure at the minimum limit on some sizes due to variable gasket compression; and damaging of the smooth pipe surface due to couplings being dragged over the pipe surface instead of lifting over the surface.

In prior art couplings, adjacent members of the annular carrier are connected by tongue and grooves which engage about a circumferential plane. Each groove is sized to provide some play wherein the tongue can be forced deeper to allow the members to be forced closer together along a circumferential plane so that the circumference of the carrier can be adjusted across a range of circumferences. These arrangements serve their purpose well in use when a pipe is inserted in the carrier as the pipe supports the ring and provides stability to the carrier. However, when a pipe is not present, for example during transit of a coupling, rotation between unsupported elements arises as the ring structure collapses. The reduced bore of a collapsed ring can create difficulties in entering the pipe into the ring. Alternatively, the linkages disengage.

The present invention aims to reduce occurrence of the above identified problems without compromise to overall performance of the coupling and to provide a coupling with technically superior performance.

DESCRIPTION

In accordance with the present invention there is provided a pipe coupling comprising;
an annular sleeve having an end configured to receive therein a plain end of a pipe and being provided with an annular first compression surface;
    an annular compression member having an annular second compression surface;
    an annular gripping means; and
    means for drawing the annular compression member and the annular sleeve axially together so as to compress the gripping means between the first and second compression surfaces so as to deform or move the gripping means radially inwardly and into gripping engagement with the pipe;
    the annular gripping means comprising a radially outer carrier component comprising an array of circumferentially discontinuous interlinked members, the carrier component being configured to contract radially in response to a radially and/or axially compressive force, a radially inner gripping component carried by the carrier, annular sealing means interlocking with the annular carrier component and/or radially gripping component disposed, in use, between a first surface of the carrier and the first annular compression surface and between a second surface of the carrier and a radially outer surface of a pipe end received in the sleeve; the gripping component having a gripping surface and being arranged for relative axial movement; the gripper and carrier components being configured such that in use, in response to axial outwards movement of a pipe received in the sleeve the gripping component is moved radially inwardly and into tighter gripping contact with the pipe,
characterised in that;
the circumferentially discontinuous members are interlinked by means of a tongue and groove connection between a groove on a first member and a tongue on an adjacent member, the opening of the groove which receives the tongue facing in a plane not in alignment with a tangent of the circumferential plane of the carrier and one of each tongue and groove pair is attached to its member by a resiliently deformable arm whereby to provide stability of the circumferential links in the absence of any additional support.

Desirably, the openings of the grooves face radially of the carrier. The opening may face radially outwardly or radially inwardly. The preferred opening position may vary with the pipe diameters for which the carrier is designed.

In their relaxed state, the deformable arms hold the carrier at a circumference which is at the maximum end of a range extending from a minimum to a maximum circumference which the carrier is configured to achieve. The smaller circumferences can be achieved by applying a circumferential load to compress the linkages and adjust the carrier circumference whereby to accommodate pipes of different diameter.

The arm may be attached at any of a number of positions to the member, it is essential only that the chosen location and configuration of the arm promotes expansion of the ring circumference (i.e. flaring of the assembled ring). Different positions and configurations of the arm may best suit different sizes of ring.

The above can be achieved through a reduced clearance between the tongue and groove at a position most proximal to the surface which faces the annular compression member. This may involve a portion of increased cross sectional area of a tongue at the stated position. Or in the alternative, provision of a decreased cross sectional area of the groove.

In a preferred option, the axis of the tongue and groove extending axially of the annular gripping means, the dimension of the groove is consistent along its axis and the tongue tapers axially being at its widest at position most proximal to the surface which faces the annular compression member.

In an alternative option, the cross sectional area is increased by means of a radial protrusion from the tongue.

In an alternative option, the cross sectional area is decreased by means of a radial intrusion in the groove.

Desirably a second tongue and groove pair is provided on adjacent members at the radially inner circumference, the second tongue and groove are configured to locate along an axis which is substantially orthogonal to that in which the first tongue and groove locate. When engaged in use, these tongue and grooves prevent the members from axially disengaging from their neighbours and provide a continuous surface to support the gasket at the carrier bore between the carriers, acting as a bridge.

Desirably, the inner radial surface of each member is arched to a degree of curvature broadly matching that of the outer diameter of a pipe within the range of which the coupling is configured to connect. Preferably the degree of curvature is comparable to that of the outer diameter of a pipe in the middle of the range of which the coupling is configured to connect.

Desirably, the gripping surface is secured to the annular gripping means by means of a sliding interface configured to resist circumferential and radial separation of the members. In one option this is achieved by axially extending dovetail connections between the gripping component and the carrier. Optionally the dove tail connections engage only at the axially extreme of the two components.

Optionally, the engaging surfaces of the annular sealing means and the carrier are provided with complimentary profiled surfaces. For example, one of the engaging surfaces might be provided with ribs and the other with complimenting ridges. Desirably the ribs and ridges extend circumferentially. The provision of these complimenting profiles encourages a similar degree and distribution of diameter reduction in both the sealing means and the carrier. Optionally, the ribbed or ridged surface of the carrier is comprised of interdigitating projections provided on adjacent members of the carrier.

Optionally, the annular gripping means is provided with a stop to limit the extent of axial movement between the gripper and carrier. In one option, the stop comprises a buffer on the engaging surface of the carrier located in a recess on the engaging surface of the gripper, the recess having a longer dimension than the buffer thereby permitting a restricted amount of axial movement but not disengagement.

In another option, the radially inner gripping component incorporates multiple gripping elements hingedly linked to form an expandable/contractable annular gripping component. In one preferred arrangement, the hinged links each comprise a pair of finger hinge elements.

In another option the coupling includes a gasket as described in the Applicant's co-pending UK patent application no. 0902430.8. That prior filed application describes various embodiments of an annular gasket having a sealing surface designated for sealing against an uneven pipe surface or pipe joint the sealing surface being provided with a raised pattern of geometric shape perimeters. The gasket may have any known cross section.

The raised pattern may, for example, comprise one or more of the following shapes; squares, circles, diamonds, rectangle, polygon or other geometric shape which describes an enclosed area. The shapes may be of substantially equal size or a plurality of sizes. The pattern may be random or repeating.

It is to be appreciated that features stated as optional or desirable may each individually improve on prior art couplings. Thus in other aspects, the invention provides a coupling incorporating any of the stated novel features whether individually or in any combination.

Some embodiments of the invention will now be further described with reference to the accompanying drawings in which;

FIGS. 1(a) and (b) show in two perspective views the novel tongue and groove arrangement provided between two members in an embodiment of a coupling in accordance with the invention.

FIGS. 2(a) and (b) show in a top view the novel tongue and groove arrangement shown in FIGS. 1(a) and (b).

FIG. 3 shows the members of FIGS. 1(a) and (b) and 2(a) and (b) in a perspective view from the underside incorporating the second tongue and groove in an orthogonal plane to the first.

FIGS. 4(a) and (b) show the member of the previous figures highlighting the optional arched bore feature of the novel carrier arrangement.

FIGS. 5(a) and (b) show an embodiment of a member in a coupling in accordance with the invention including a sliding interface securing the gripping surface to the annular gripping means.

FIGS. 6(a) and (b) show an embodiment of a member in a coupling in accordance with the invention including a profiled surface on the engaging surface of the carrier with a complimenting surface of the annular sealing means (not shown) and interdigitating projections provided on adjacent members of the carrier.

FIGS. 7(a) and (b) show an embodiment of a member in a coupling in accordance with the invention including a stop to limit the extent of axial movement between the gripper and carrier.

Figure 4A:
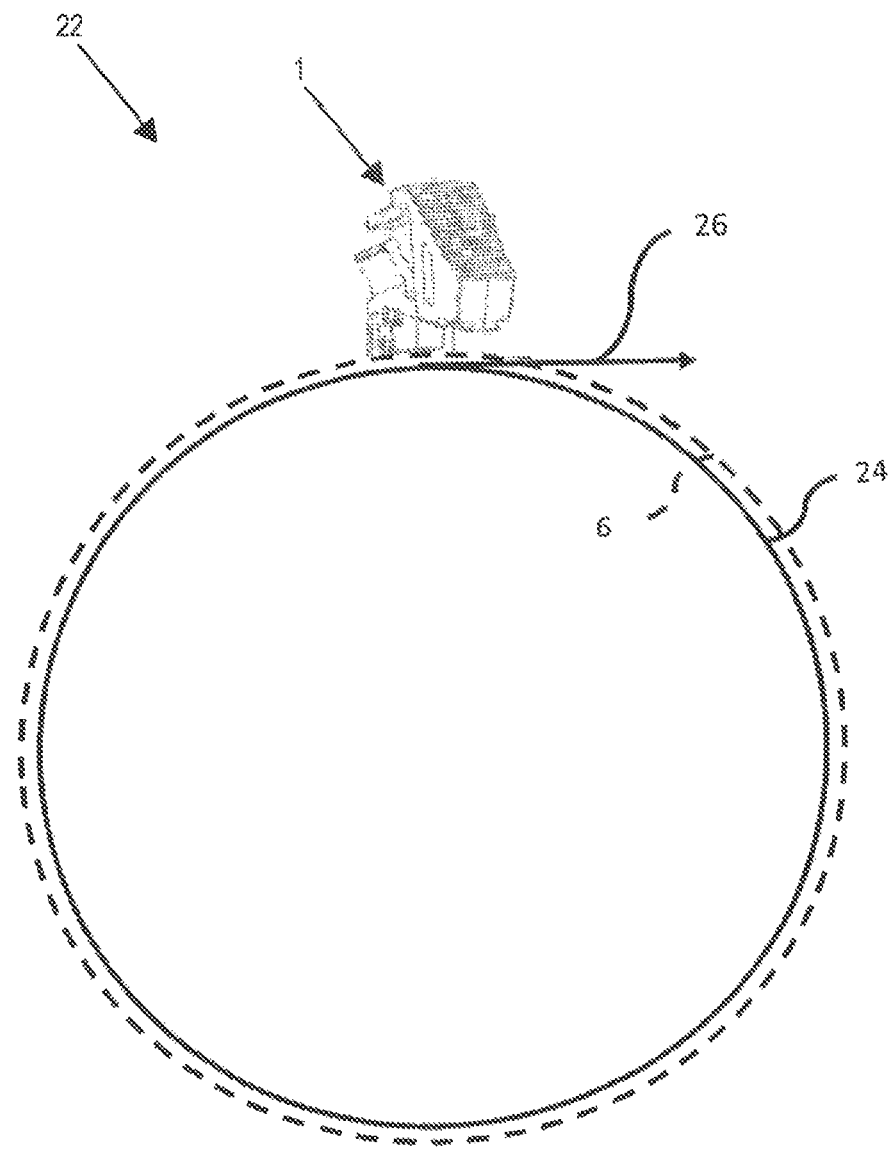

The figures show carrier members (1) of a pipe coupling (22) (shown in FIG. 4(*a*)) as including multiple carrier members (1) arranged annularly, typically of a plastic material, interconnected by a tapered spring feature comprising the tongue and groove connectors (3,2) wherein tapering of the tongue (3), which includes a deformable arm 23, in contact with the adjacent carrier member will urge the carrier members in the assembled ring to be open or flared at its outer most axial end in the free state. This unloaded and flared state will encourage the abrasive gripper surfaces to be clear of the pipe surface 24 (schematically represented by dashed lines in FIG. 4(*a*)) whilst the axially inner end of the carrier assembly connected to the gasket will have a bore less than the outer end and will make contact with the pipe surface 24 first. It is encouraged that the bore of the carrier and the gasket should make this contact on the pipe surface 24 before the grippers to avoid damage to the pipe surface 24 which can lead to leakage.

Figure 1:
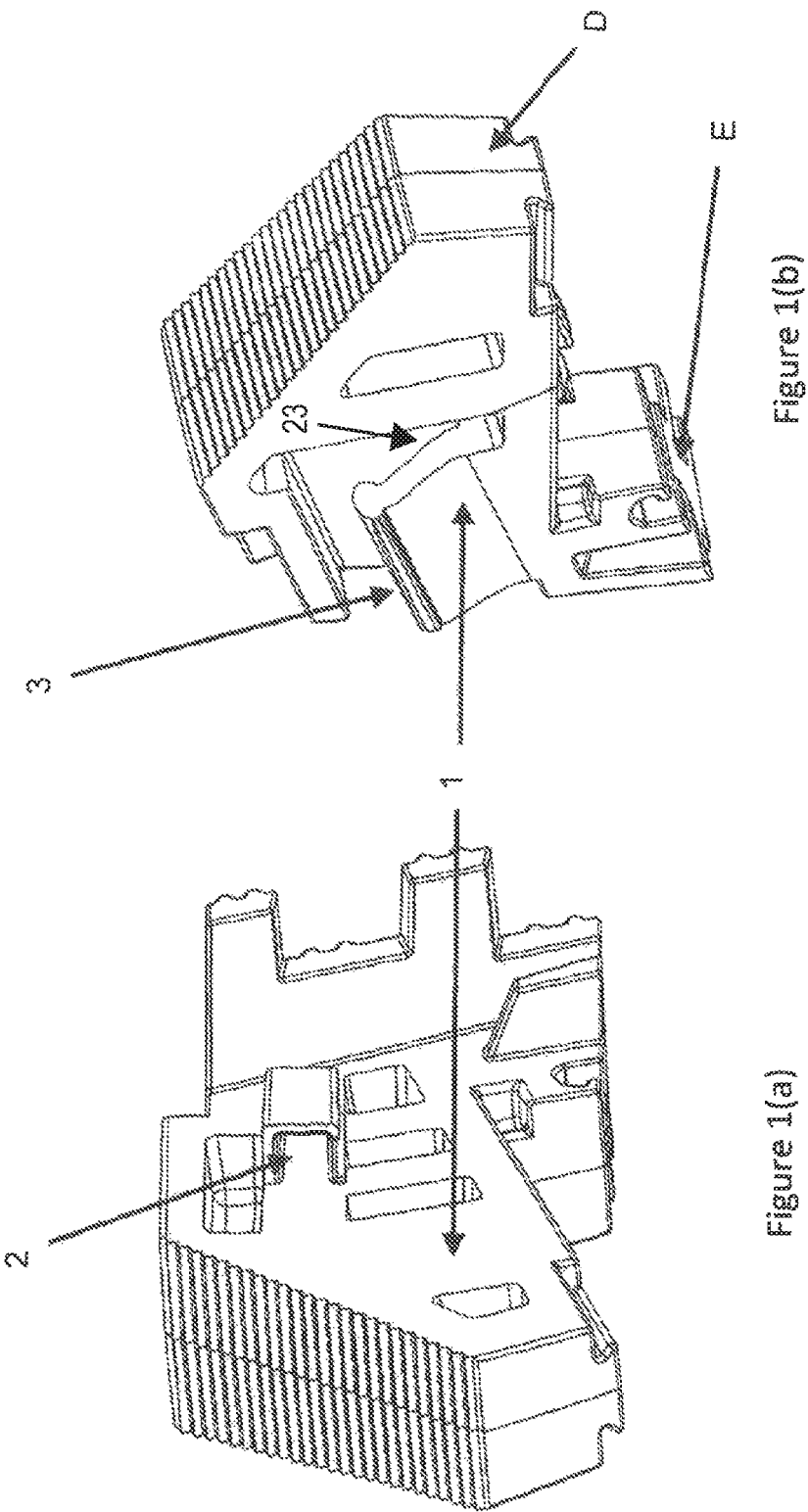
Figure 2:
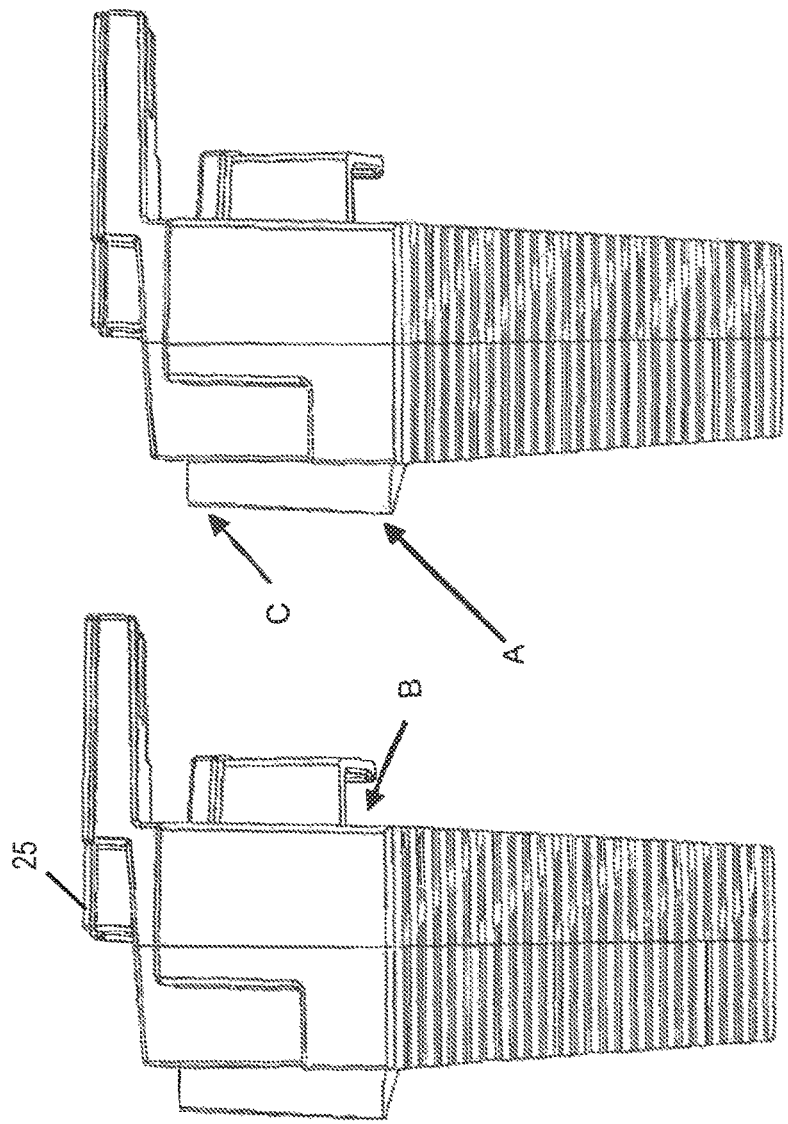

With reference to FIGS. 1(*b*) and 2, the contact point A of the hinge will contact the face B of the adjacent carrier before point C which when assembled in the ring will tend to flare end D to a diameter larger than end E.

The carrier members when assembled in a ring or arc are possible to pick up as an assembly without the carrier members becoming disconnected. This is advantageous of prior art carrier/gripper assembly designs in which during assembly with gasket to a pipe the arc or ring of carrier members can become disengaged.

Figure 3:
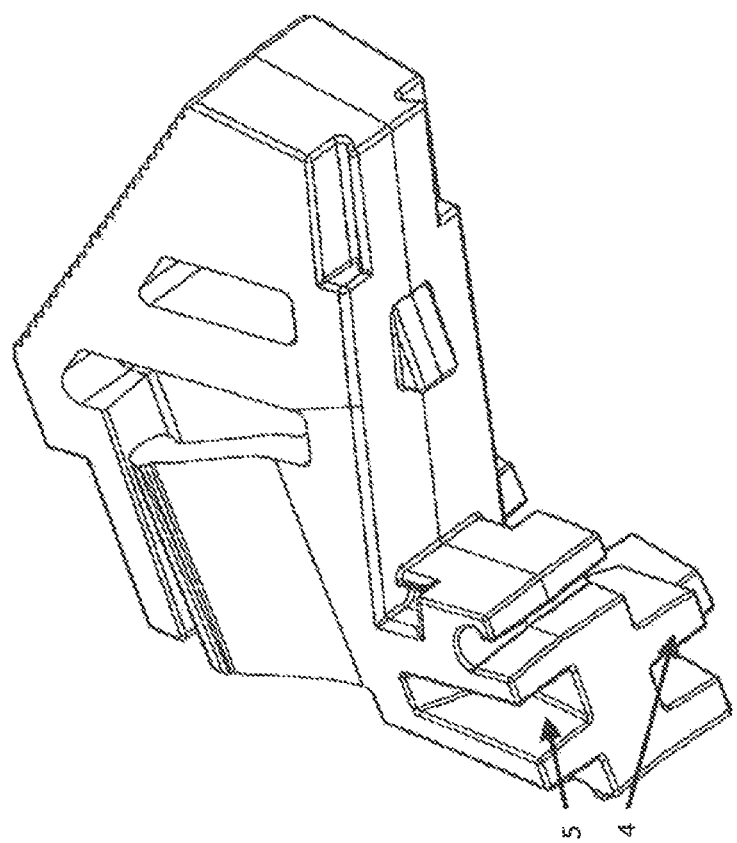

A second tongue and groove connection (4,5) can be seen in FIG. 3. The tongue and grooves (4,5) are of such circumferential length that during assembly of one carrier member (1) to another the carrier members are introduced to one another by sliding the sprung tongue (3) along the retaining groove (2) whilst creating a reverse arc such that the tongue (4) and groove (5) of an adjacent member can pass each other until the sprung tongue (3) reaches its final axial position within the retaining groove (2). At this point the carrier members are rotated about the sprung tongue (3) in its retaining groove (2) to create a positive arc during which the tongue (4) locates within the groove (5) of the adjacent carrier member.

The interconnecting tongues (3) and grooves (2) are located by sliding the tapered tongue (3) within a retaining groove (2) of the adjacent carrier member (1). Together the tongues (3, 4) and grooves (2, 5) such that accidental circumferential detachment of adjoining members is prevented but allowing relative axial and limited radial freedom of movement.

As illustrated in FIG. 4, the inner surface (6) (an example of a second surface) of the carrier members which collectively define the bore of the carrier which in use lies in contact with the gasket (FIG. 9) is arced to a radius which is similar to that of the pipe onto which it will be assembled. This arrangement provides a more uniform compression of the gasket on the pipe to ensure more efficient sealing capacity. Prior art carrier members have flat surfaces which when forming the polygonal carrier ring result in a consequential uneven compression of the gasket on the pipe surface 24, which has a tangent along a direction represented by an arrow identified with numeral 26.

As shown in FIG. 5, paired carrier member (1) and gripper elements (7) have complimentary dove tails (8,9) or other sliding interface at their side edges to prevent relative sideway and radial detachment of the gripper element (7) from the carrier member (1) during handling and assembly to the pipe. It will be appreciated that in the alternative, these could be located centrally rather than at the edges. Optionally the gripper members (7) and carrier members (1) will dovetail at the extreme axial ends of the components and not on the sides, which will engage as the gripper elements (7) are slid on the carriers to form the sub assembly.

As can be seen in FIG. 6, on their gasket engaging surface (10), carrier members (1) are provided with a ribbed (11) surface which compliments a ridged surface on the gasket (not shown). This encourages the gasket and the carrier ring to reduce in diameter by the same amount during assembly to a bottom tolerance pipe. Prior art carrier gasket engaging surfaces are smooth between the gasket inner surface and the carrier front surface and it is the key interface of the gasket in the bore of the carrier ring that drags the gasket about a bottom tolerance pipe. This can cause the gasket to disengage from the bore of the carrier ring. The novel feature now described causes the gasket to engage on ribs (11) on the front face (10) of the carrier members (1) over the entire sealing area which assists in getting the gasket to reduce in diameter without as much dragging from the bore. This prevents leakage due to the gasket becoming disengaged from the carrier bore.

Also shown in FIG. 6, each carrier member (1) on its front gasket face has integral fingers (12) overlapping the gap between the carrier members serving both to reduce this gap for supporting the gasket and to ensure that there are at least one or more circumferential rings on the carrier assembly that have essentially no gap or insignificant gap thereby providing an improved sealing profile preventing the migration of pressure from the internal pipe.

Optionally the carrier may incorporate an overlap (16) to engage in a recess (17) at its outer radial surface to bridge the gaps at that location thus creating a continuous surface preventing dirt and other contaminants to enter between the carrier segments (1).

Figure 7A:
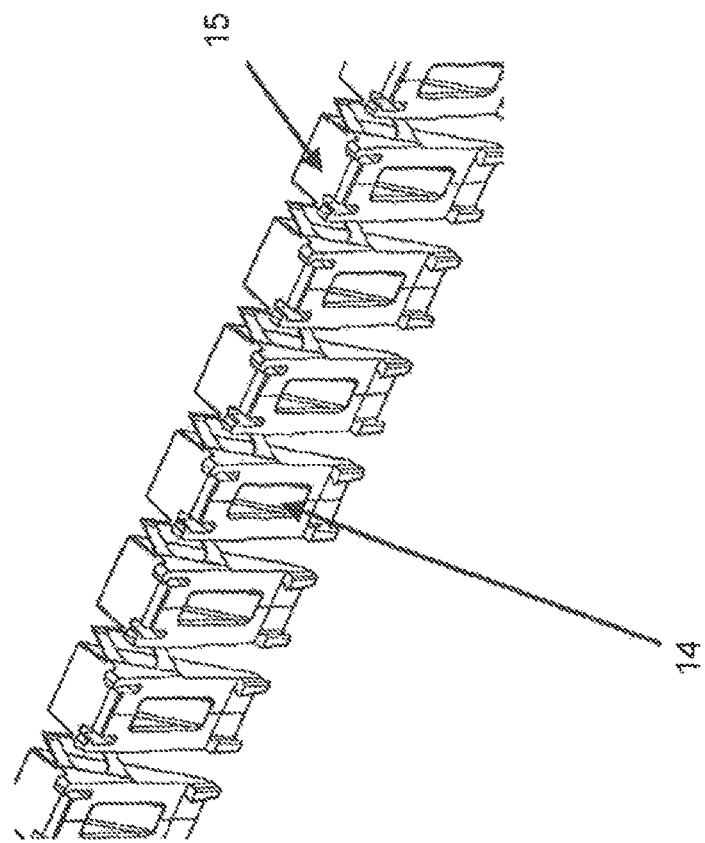
Figure 7B:
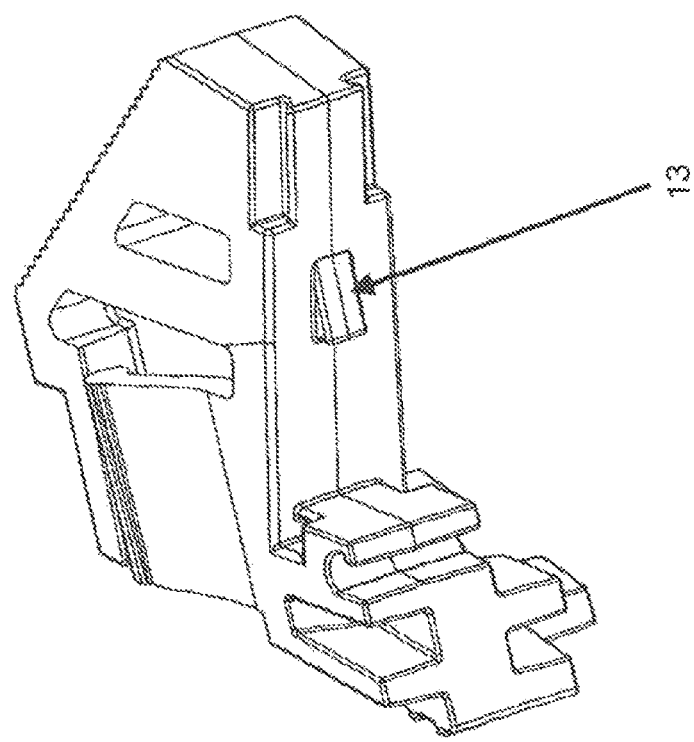

As can be seen from FIG. 7, the carrier member has in its annular recess and more precisely on its gripper interface surface, a buffer stop (13) which locates in a recess (14) of the gripper element (15) (an example of a radially inner gripping component) and against which the gripper (15), after a measured axial movement, will engage to provide resistance to further axial movement and its eventual expulsion from the carrier member (1) during use. In the relaxed condition the buffer stop (13) will be a significant distance from the engaging wall of the recess (14) of the gripper (15). Only when the gripper (15) is axially withdrawing from the carrier member (1) under load will the stop engage the gripper and prevent any further axial withdrawal.

Figure 8:
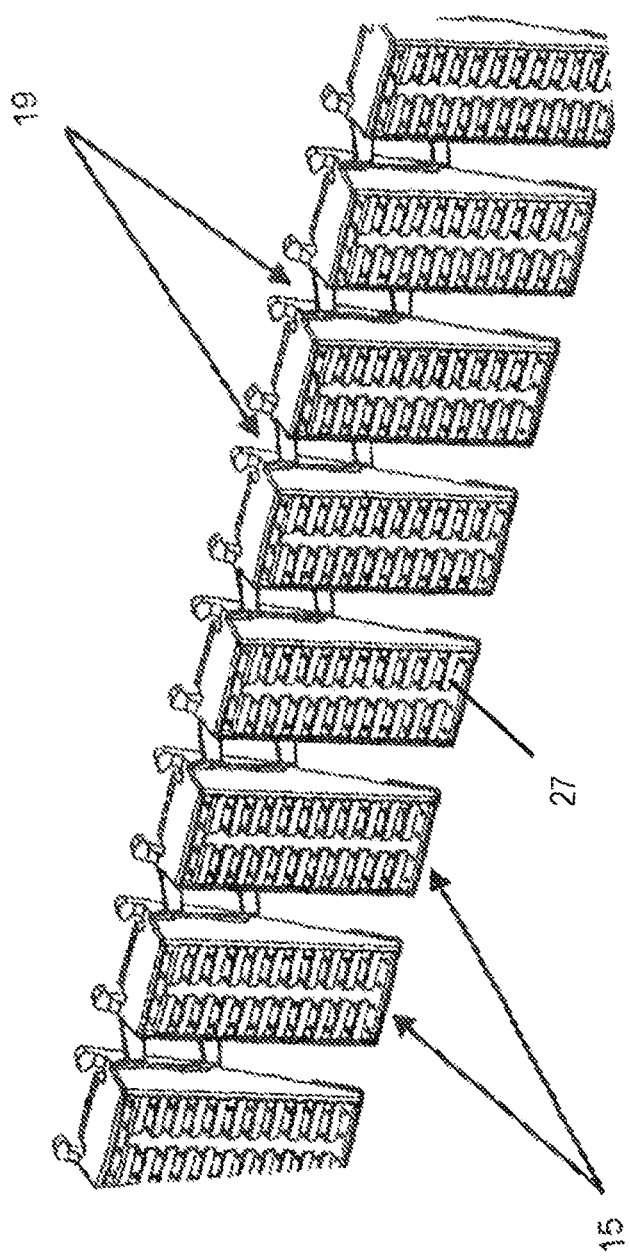
FIG. 8 shows an embodiment of a member in a coupling in accordance with the invention comprising a pair of finger hinge elements between adjacent pairs of gripping elements.

As illustrated in FIG. 8, gripper elements (15) include a respective gripping surface (27) and incorporate an interconnecting hinge (19) to link multiple gripper elements together for economic handling during the build of the carrier/gripper sub assembly. As can be seen, the hinge is split into two finer hinge elements which can move in all relative directions to ease assembly of a bank of grippers in to the carrier ring. This is advantageous over a single wide hinge used in prior art arrangements which allowed flexibility only in one axis and prevent axial movement of one gripper element relative to another within a bank of gripper elements. This in turn prevents the bank being assembled one segment at a time if the corresponding carrier members are fixed together and prevents relative axial movement. The proposed twin hinge arrangement considerably simplifies the process of assembling the gripper elements into the carrier.

Figure 9:
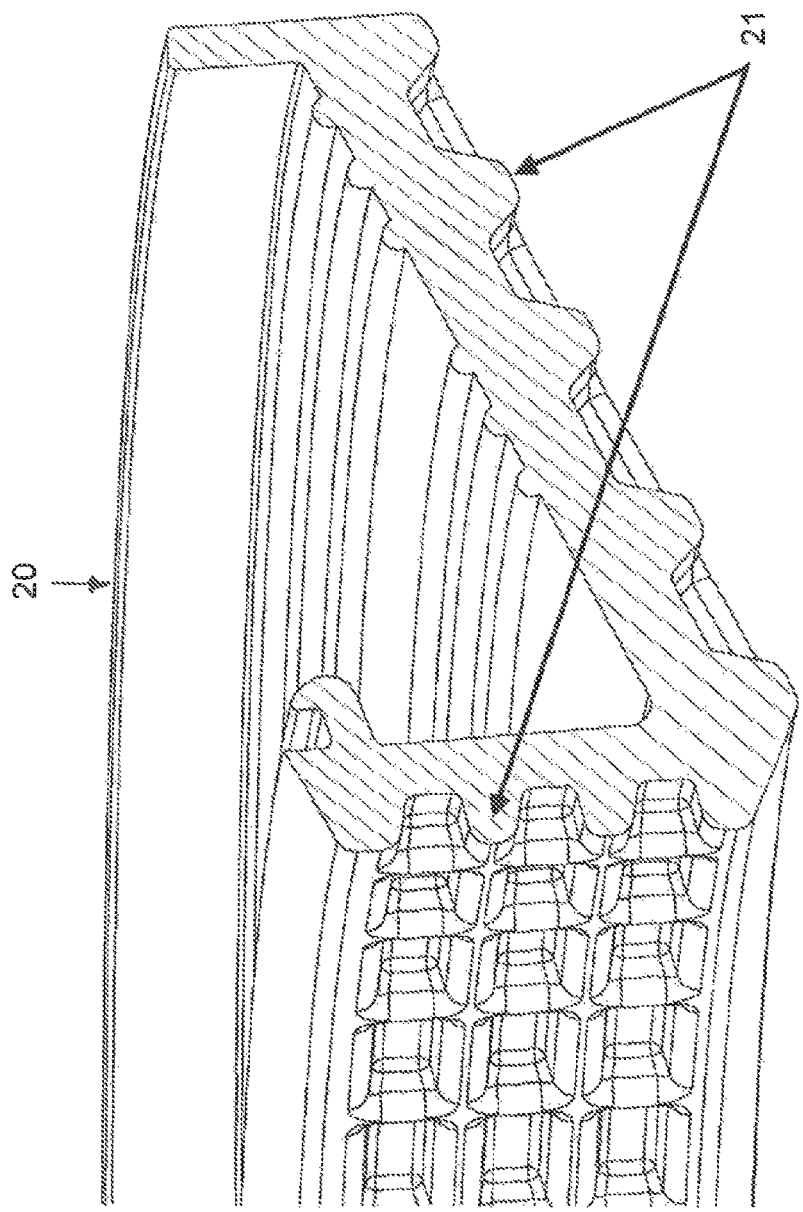
FIG. 9 shows an optional gasket configuration of the coupling in accordance with the invention and is described in Applicant's co-pending UK patent application no. 0902430.8.
Figure 10:
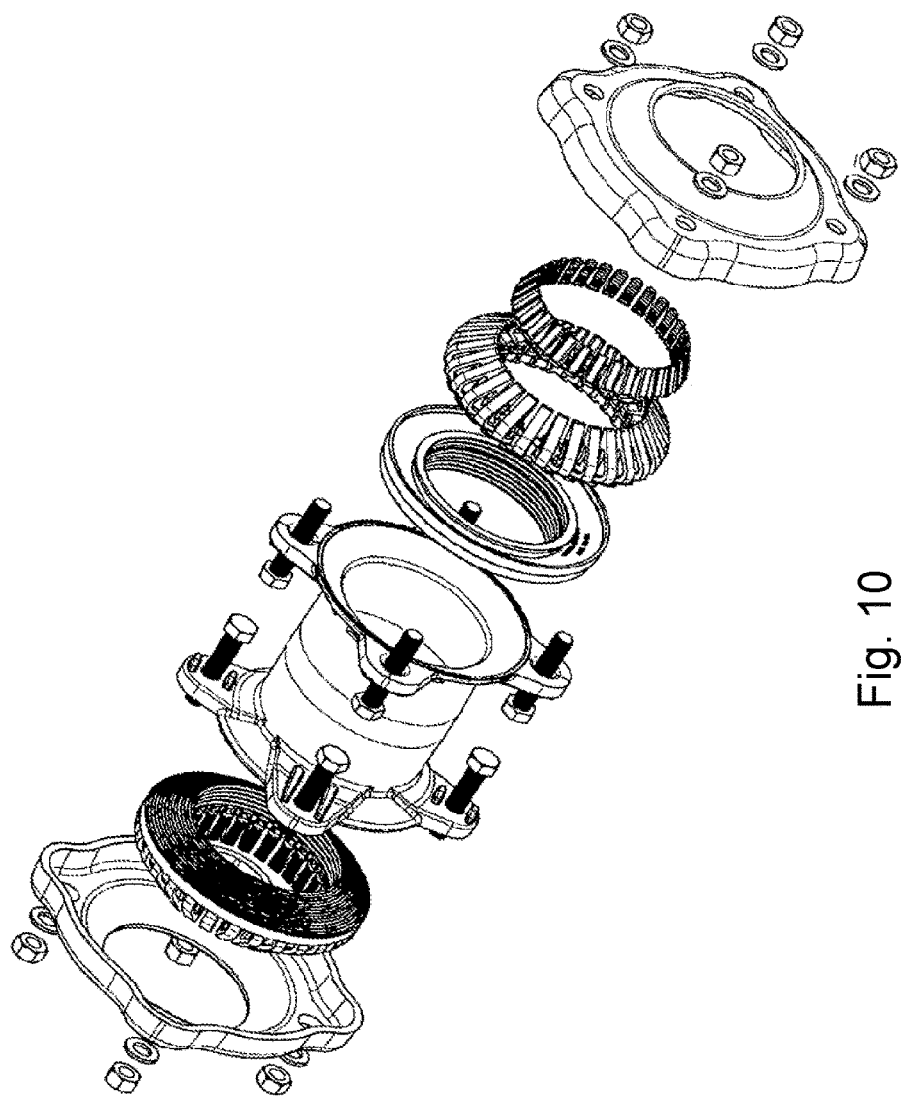
FIG. 10 shows an oblique exploded view of a prior art joint for coupling pipes—disclosed in European Patent Application Number 2090815 published Aug. 19, 2009—which includes an annular array of gripper supports and an elastomer sealing ring.
Figure 11:
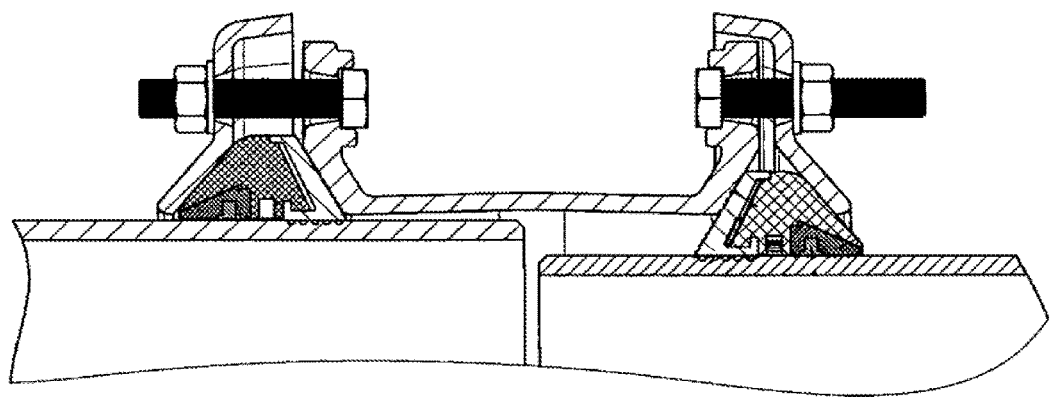
FIG. 11 shows a cross-section of the prior art joint of FIG. 10 coupling adjacent ends of two pipes to one another.

FIG. 9 illustrates the applicant's own prior art gasket design. As shown, the gasket (20) incorporates a waffle or pocketed surface on either or both the bore and front surfaces to enhance the gasket pressures on the pipe and/or sleeve respectively. The pockets are defined by the waffle lines 21. The proposed waffled gasket bore or other non uniform surface offers greater local gasket compression, and consequently greater accommodation of pipe surface defects. Additionally the gasket bore can be thicker than is provided in prior art designs since the force required to compress a reduced surface area is much less than that required for the prior art full contact surface. The bore of the novel gasket (20) protrudes further beyond the gripper face intruding into the bore of the coupling to ensure that the gasket (20) is compressed further before the gripper face engages the pipe (not shown). The same or similar pattern on the front face of the gasket (20) also has the same advantages in providing greater tolerance to carrier movement and sleeve sealing area irregularities whilst still maintaining adequate gasket pressure for sealing.

Not only do the proposed design improvements address the technical disadvantages already highlighted for prior art coupling designs, they have been found to deliver further improvements in performance such as raising the working pressure of the coupling from 10 bar to 16 bar and accommodating certain pipe topography standards simulating corroded pipe.

The invention claimed is:

1. A pipe coupling for receiving a plain end of a pipe, comprising:
    an annular gripper which is compressible so as to deform or move radially inwardly and into gripping engagement with the pipe;
    wherein the gripper comprises a radially outer carrier component comprising an array of circumferentially discontinuous interlinked members, the carrier component being configured to contract radially in response to a radially and/or axially compressive force applied to the pipe, a radially inner gripping component carried by the carrier component, an annular seal interlocking with the carrier component and/or the gripping component and being disposed, in use, between the carrier component and a radially outer surface of the pipe, the gripping component having a gripping surface and being arranged for axial movement relative to the carrier component, the gripping and carrier components being configured such that in use, in response to axial outwards movement of the pipe, the gripping component is moved radially inwardly and into tighter gripping contact with the pipe;
    wherein the interlinked members are interlinked by means of a tongue and groove connection between a groove on a first interlinked member and a tongue on an adjacent, second interlinked member, the opening of the groove which receives the tongue facing radially and not in alignment with a tangent of a circumferential plane of the carrier component and one of the tongue and the groove of each tongue and groove pair comprising a resiliently deformable arm, whereby to provide stability of the interlinked members in the absence of any additional support.

2. A pipe coupling as claimed in claim 1, wherein the openings of the grooves face radially of the carrier component.

3. A pipe coupling as claimed in claim 2, wherein the openings of the grooves face radially outwardly or radially inwardly.

4. A pipe coupling as claimed in claim 1, wherein a clearance between the tongue and the groove is smaller at one end thereof.

5. A pipe coupling as claimed in claim 4, wherein an axis of the tongue and the groove extends in an axial direction of the pipe, the dimension of the groove being consistent along the axial direction of the pipe and the tongue tapering in the axial direction of the pipe, being at its widest at the one end thereof.

6. A pipe coupling as claimed in claim 4, wherein the clearance is decreased by a radial protrusion from the tongue or a radial intrusion in the groove.

7. A pipe coupling as claimed in claim 1, wherein a second tongue and groove pair is provided on adjacent interlinked members, an axis of the tongue and the groove of the second groove pair being substantially orthogonal to an axis of the tongue and the groove of the first tongue and groove pair.

8. A pipe coupling as claimed in claim 1, wherein the gripping surface is secured to the gripper as a sliding interface configured to resist circumferential and radial separation of the interlinked members.

9. A pipe coupling as claimed in claim 8, wherein the sliding interface comprises axially extending dovetail connections between the gripping component and the carrier component.

10. A pipe coupling as claimed in claim 9, wherein the dovetail connections engage only at the axial extreme of the interlinked members.

11. A pipe coupling as claimed in claim 1, wherein the engaging surfaces of the seal and the carrier component are provided with correspondingly profiled surfaces.

12. A pipe coupling as claimed in claim 11, wherein the profiled surfaces comprise ribs on one of the engaging surfaces and complementing ridges on the other of the engaging surfaces.

13. A pipe coupling as claimed in claim 11, wherein the profiled surface of the carrier component is comprised of interdigitating projections provided on adjacent interlinked members.

14. A pipe coupling as claimed in claim 1, wherein the gripper is provided with a stop to limit an extent of axial movement between the gripping component and the carrier component.

15. A pipe coupling as claimed in claim 1, wherein the gripping component incorporates multiple gripping elements hingedly linked to form an expandable/contractable annular gripping component and the hinged links each comprise a pair of finger hinge elements.

16. A pipe coupling as claimed in claim 1, wherein the seal is a gasket having a sealing surface provided with a raised pattern of geometric shape perimeters.

17. A pipe coupling as claimed in claim 1, wherein the tongues of the first tongue and groove pairs each comprise a resiliently deformable arm.

18. A pipe coupling as claimed in claim 1, wherein the grooves of the first tongue and groove pairs each comprise a resiliently deformable arm.

* * * * *